US006445508B1

(12) United States Patent
Thibault

(10) Patent No.: US 6,445,508 B1
(45) Date of Patent: Sep. 3, 2002

(54) F-SIN(θ) LENS SYSTEM AND METHOD OF USE OF SAME

(75) Inventor: Simon Thibault, Sainte-Foy (CA)

(73) Assignee: National Optics Institute, Quebec (CA)

( * ) Notice: Subject to any disclaimer, the term of this patent is extended or adjusted under 35 U.S.C. 154(b) by 0 days.

(21) Appl. No.: 09/406,579

(22) Filed: Sep. 24, 1999

(30) Foreign Application Priority Data

Aug. 19, 1999 (CA) .............................................. 2280531

(51) Int. Cl.$^7$ .......................... G02B 3/00; G02B 26/08; G02B 26/10
(52) U.S. Cl. .......................... 359/662; 359/206; 347/258
(58) Field of Search .............................. 359/662, 206; 347/258, 241, 244

(56) References Cited

U.S. PATENT DOCUMENTS

| | | | | |
|---|---|---|---|---|
| 4,571,034 A | | 2/1986 | Nakamura | 359/719 |
| 4,688,880 A | | 8/1987 | Tatsuno | 359/19 |
| 4,695,132 A | | 9/1987 | Sakuma | 359/662 |
| 4,770,517 A | | 9/1988 | Sakuma | 359/793 |
| 4,786,174 A | | 11/1988 | Witte | 356/328 |
| 6,067,106 A | * | 5/2000 | Ishibe et al. | 347/258 |
| 6,137,641 A | * | 10/2000 | Gilby | 359/846 |

FOREIGN PATENT DOCUMENTS

| | | |
|---|---|---|
| EP | 0 288 970 | 11/1988 |
| EP | 0 595 533 | 5/1994 |
| JP | 09089668 | 4/1997 |

OTHER PUBLICATIONS

Sasian J.M. et al: "Design, assembly, and testing of an objective lens for a free–space photonic switching system" OPTICAL ENGINEERING, US, SOC. OF PHOTO–OPTICAL INSTRUMENTATION ENGINEERS. BELLINGHAM, vol. 32, No. 8, Aug. 1, 1993, pp. 1871–1877.

* cited by examiner

Primary Examiner—Georgia Epps
Assistant Examiner—Tim Thompson
(74) Attorney, Agent, or Firm—Akerman Senterfitt

(57) ABSTRACT

An optical system for focusing an incident light so as to obtain a linear output (as a function of the wavelength, or of the order of diffraction, or of the grating spacial frequency or of the inverse of the index of refraction) comprises a diffraction grating and a lens, or a group of lenses, having a f-Sin(θ) characteristic, where f is the effective focal length of the lens, or group of lenses, and θ is an output angle of the light exiting from the diffraction grating. Therefore, a light incident on the diffraction grating reaches the lens, or the group of lenses, and results in a linear output. Using the present invention in a spectrometer reduces the time consuming calibration process required and renders it easier because of the linear output between wavelength and pixels positions. The lens, or group of lenses, has a diffractive, refractive or reflective property, or any combination thereof. The incident light can be a collimated, converging or diverging beam. The diffraction grating can be a plane, concave or convex grating.

9 Claims, 7 Drawing Sheets

F-SIN(θ) LENS SYSTEM AND METHOD OF USE OF SAME

BACKGROUND OF THE INVENTION

1. Field of the Invention

The present invention relates to lenses used in optical systems and, more particularly to a new lens or a new lens group.

2. Description of the Prior Art

Introducing the desired amount of distortion in an optical system is possible and relatively straight forward for optical designers. Known fθ lenses (as in U.S. Pat. Nos. 4,695,132 issued on Sep. 22, 1987 to Sakuma and No. 4,770,517 issued on Sep. 13, 1998 also to Sakuma) used in laser scanner systems are one of the most popular lenses of this type. Over the past decade or two, system improvements have shifted product emphasis toward electronic features and digital processing, such that optical system design has frequently been relegated to a low priority. Recently, there has been a revival of interest in solving optical problems with innovative optical design. On the other hand, it is possible to simplify considerably the task of the software by designing more sophisticated optical elements.

For example, a spectrometer uses a diffraction grating to spread the spectral component of a light incident of the grating on a one (1) dimensional detector. However, on the detector, the spectral components are not spread linearly such that the resolution is thus not constant and the calibration process must be applied very carefully to prevent error.

It would thus be desirable to have a lens, or group of lenses, which when used with a diffraction grating would yield a linear output thereby substantially eliminating a time consuming calibration process.

OBJECTS OF THE INVENTION

It is therefore an aim of the present invention to provide a new lens or lens group.

It is a also an aim of the present invention to provide a new system which combines the new lens and a diffraction grating providing a linear output plane as a function of the wavelength ($\lambda$), or of the order of diffraction (m), or of the grating spatial frequency ($1/\Lambda$), or of the inverse of the index of refraction (n).

It is a further aim of the present invention to provide a new lens or lens group with proper amount of distortion to provide a f-Sin(θ) characteristic. The optical lens may have a positive or a negative power and it can be refractive, diffractive and reflective or in combination.

SUMMARY OF THE INVENTION

Therefore, in accordance with the present invention, there is provided an optical system for obtaining a linear output from an incident light, comprising a diffraction grating and a lens having a f-Sin(θ) characteristic, where f is the effective focal length of said lens and θ is an output angle of the light exiting from said diffraction grating, wherein a light incident on said diffraction grating reaches said lens and results in a linear output.

Also in accordance with the present invention there is provided an optical system for obtaining a linear output from an incident light, comprising a diffraction grating and a group of lenses having a f-Sin(θ) characteristic, where f is the effective focal length of said group of lenses and θ is an output angle of the light exiting from said diffraction grating, wherein a light incident on said diffraction grating reaches said group of lenses and results in a linear output.

If a f-Sin(θ) lens or lens group is introduced for instance in a spectrometer, this new lens provides a correction for the deflection of the laser beam which takes place at a linear position with the wavelength in the detector plane. Specifically, when the diffraction grating is positioned on the entrance pupil of the f-Sin(θ) lens having an effective focal length of f, with respect to the optical axis thereof, the beam will be focussed onto the detector plane at a point which is displaced by a distance of f-Sin(θ) from the optical axis. According with the grating equation at normal incidence $$\mathrm{Sin}(\theta) = \frac{m \cdot \lambda}{n \cdot \Lambda},$$

where θ is the diffraction angle, m is the diffraction order, $\lambda$ is the wavelength, n the index of the refraction and $\Lambda$ the grating period, the distance from the optical axis of the focused beam is a linear function of the wavelength. Then the calibration can be simplified because the spectral component of a light signal spread on the detector is linearly distributed on the linear detector. Furthermore the resolution is constant over the wavelength operating range. The designation ,"f-Sin(θ) lens", or "f-$\lambda$ lens", is derived from such fact.

The present invention can solve the problem associated with the nonlinear imaging process in the spectrometer and it can solve also other problems. This invention is intended to provide a new lens or lens group which can be used with a diffraction grating to provide a linear output plane with the wavelength ($\lambda$), but also with the order of diffraction (m), or with the grating spatial frequency ($1/\Lambda$), or with the inverse of the index of refraction (n).

Accordingly, the invention provides a new lens or a new lens group with proper amount of distortion to provide a f-Sin(θ) characteristic. The optical lens or lens group of the present invention has a positive or a negative power and it can be refractive, diffractive and reflective or a combination of all these properties.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
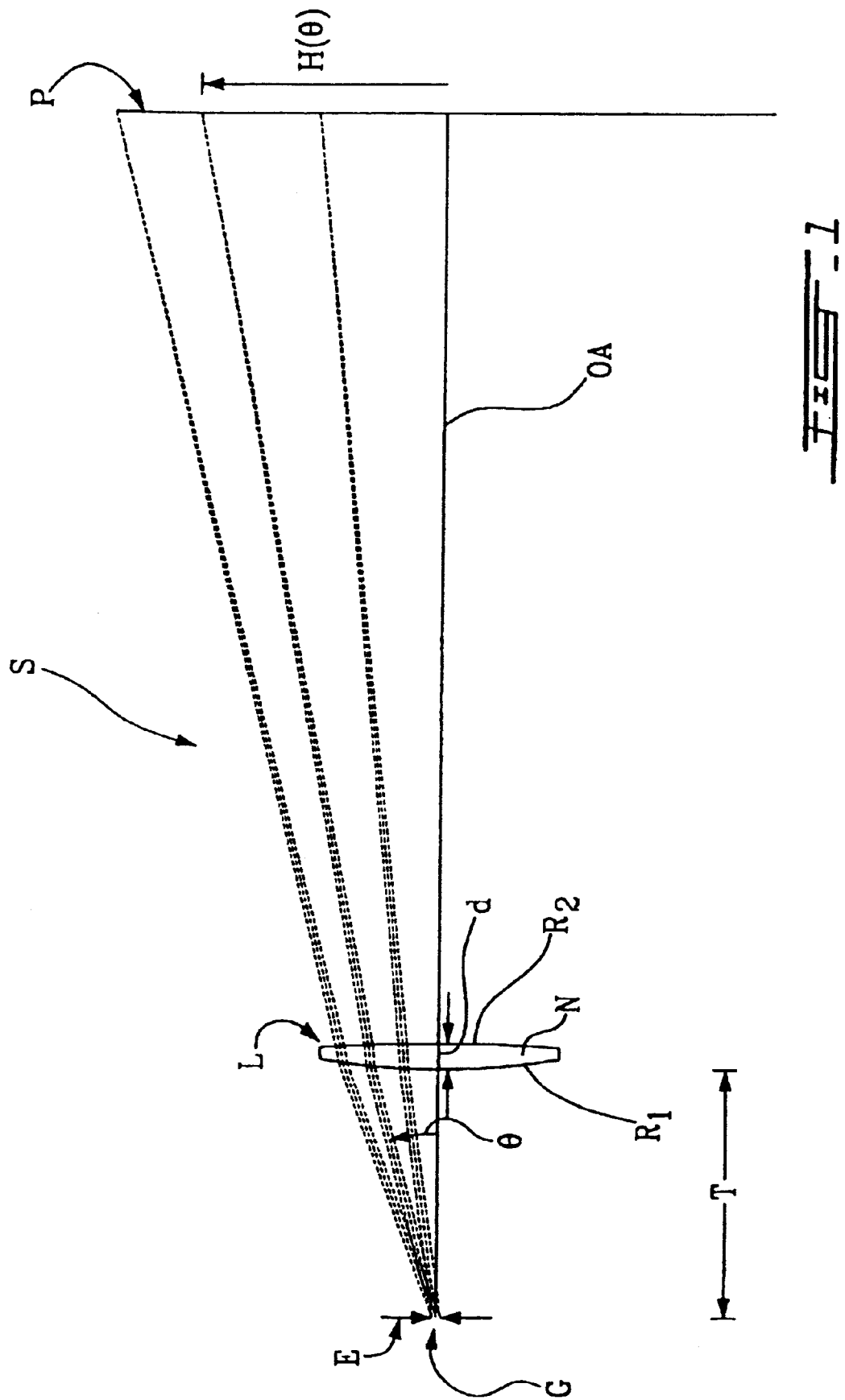
FIG. 1 is the optical layout of the refractive configuration of a f-Sin(θ) single lens in accordance with the present invention.

The f-Sin(θ) lens system of the present invention represents in its most simple arrangement a single lens L, as shown in FIG. 1. As shown, a radius of curvature of a first surface is represented by R1, a radius of curvature of a second opposed surface by R2, the separation between the lens surfaces R1 and R2 by d, and the index of refraction of the lens L is represented by N. The variables described above form the lens L. The lens variables are calculated to minimize the f-Sin(θ) characteristic. This can be done by a proper merit function in any optical design software.

The f-Sin(θ) characteristic can be defined by $$[f \cdot Sin(\theta)] \text{ characteristic} = \frac{H(\theta) - f \cdot Sin(\theta)}{f \cdot Sin(\theta)} \cdot 100,$$

where θ represents the diffraction angle from the diffraction grating and H(θ) corresponds to the height of the focused beam in the image plane with respect to the optical axis of the focused beam [show the optical axis on the drawings]. The f-Sin(θ) characteristic signifies a deviation from an ideal f-Sin(θ) characteristic, in percentage. For an ideal f-Sin(θ) lens or lens group, H(θ)=fSin(θ) for every angle of incidence, and the f-Sin(θ) characteristic is equal to zero.

Figure 2:
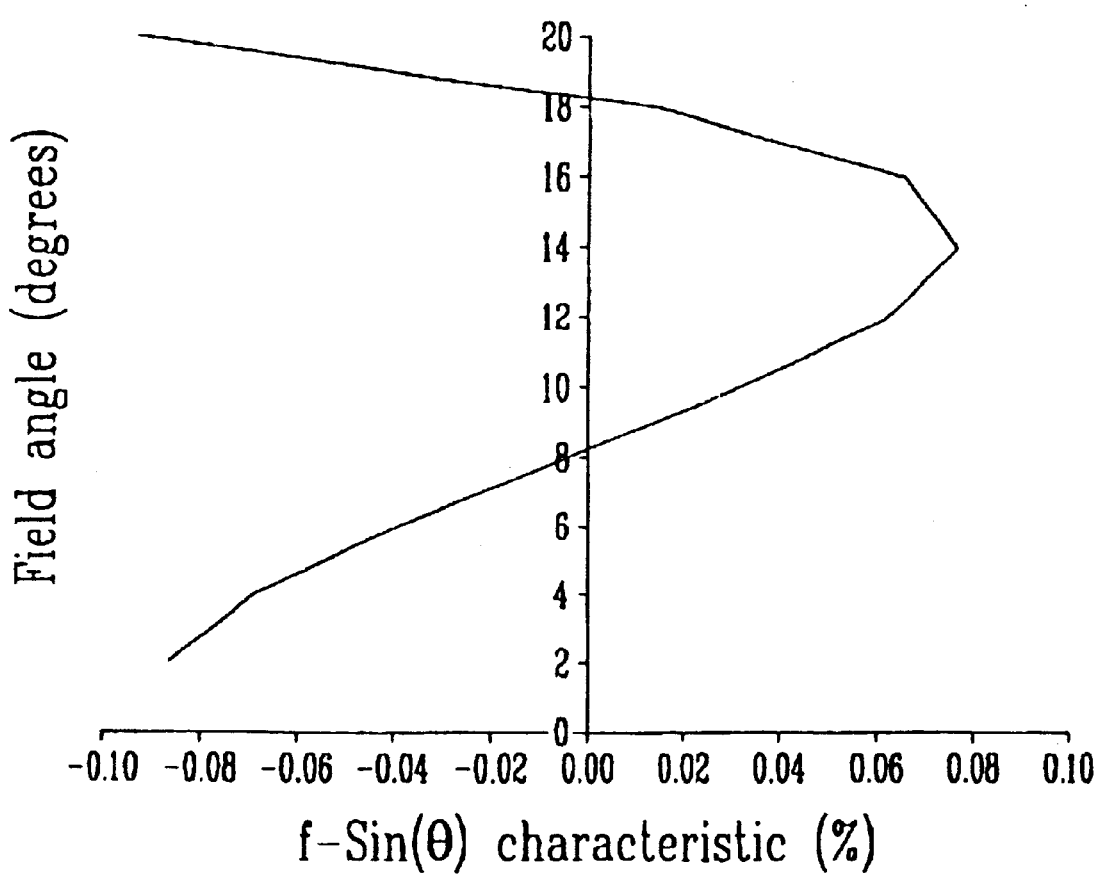
FIG. 2 graphically illustrates the f-Sin(θ) correction in the arrangement of FIG. 1.

The permissible values of f-Sin(θ) characteristic are difficult to evaluate, it may depend on the kind of application. It is relatively easy to use +/−0.1% as a good starting point. This value is a typical number used for the fθ lens. FIG. 2 shows the f-Sin(θ) characteristic of the lens of FIG. 1.

It is the second object of the present invention to provide a new optical system S. This new system combines the f-Sin(θ) lens and a diffraction grating. The main optical elements of the new optical system S comprise of a diffraction grating G placed on the entrance pupil E of the f-Sin(θ) lens (see on FIG. 1), the f-Sin(θ) lens L and an image plane P which in the illustrated embodiments takes the form of a focal plane (in other cases, the image plane could be a conjugated plane) The optical system S of the present invention operates by transmitting a light beam, for instance a collimated light beam, from a light source through the diffraction grating G, the diffracted light passes through the f-Sin(θ) lens L and is focused in the image plane P.

If the light incident on the grating G is polychromatic, the diffraction grating G spreads the light in the "m" order of diffraction (m=1, by example). Then, the position of the light spread in the image plane P is directly proportional to the wavelength of the light. We can derive this fact from the grating equation:

$$H(\theta) = f \cdot Sin(\theta) = f \cdot \frac{m \cdot \lambda}{n \cdot \Lambda} = A \cdot \lambda = H(\lambda).$$

As we can see, the height H(θ) is a linear function of the variable λ (i.e. the light's wavelength). To respect the linearity, the order of diffraction (m), the index (n) and the grating period (Λ) must be constant.

The designation "f-λ lens" is derived from such fact.

If the light incident on the grating G is monochromatic, the diffraction grating G diffracts the laser beam into several diffraction orders. The position of the diffraction order in the image plane P is then directly proportional to the diffraction order produced by the diffraction grating following the equation:

$$H(\theta) = f \cdot Sin(\theta) = f \cdot \frac{m \cdot \lambda}{n \cdot \Lambda} = B \cdot m = H(m).$$

As we can see, the height H(θ) is a linear function of the variable m (that is the order of diffraction). To respect the linearity, the wavelength (λ), the index (n) and the grating period (Λ) must be constant.

If the light incident on the grating G is monochromatic, the diffraction grating diffracts the laser beam into one diffraction order. The position of the diffracted light in the image plane P is then directly proportional the spatial frequency of the diffraction grating following the equation:

$$H(\theta) = f \cdot Sin(\theta) = f \cdot \frac{m \cdot \lambda}{n \cdot \Lambda} = C \cdot \frac{1}{\Lambda} = H\left(\frac{1}{\Lambda}\right).$$

As we can see, the height H(θ) is a linear function of the variable 1/Λ (that is the reverse of the grating period). To respect the linearity, the wavelength (λ), the index (n) and the diffraction order (m) must be constant.

If the light is not normal incident but made an angle β with the diffraction grating normal GN (see FIG. 7) on the diffraction grating G. the linearity is respected as the following equation:

$$H(\theta) = f \cdot Sin(\theta) = f \cdot \left(\frac{m \cdot \lambda}{n \cdot \Lambda} + Sin(\beta)\right).$$
$$= A\lambda + E$$
$$= Bm + E$$
$$= C\frac{1}{\Lambda} + E$$

where E is a new constant equal to the following equation:

$$E = f \cdot Sin(\beta)$$

The diffraction grating may be plane, convex or concave, and other possible gratings may be used, for instance an aspheric diffraction grating.

EXAMPLES OF PREFERRED EMBODIMENTS

All optical surfaces of the present invention respect the following sag equation:

$$z(r) = \frac{c \cdot r^2}{1 + \sqrt{1 - (1 + \delta) \cdot c^2 \cdot r^2}},$$

where c is the curvature (the reciprocal of the radius of curvature (1/R)), r is the radial coordinate and δ is the conic constant.

FIG. 1 shows the single f-Sin(θ) lens with the following prescription:

| | | | |
|---|---|---|---|
| R1 = 73.28 mm | d = 2.7 mm | Material:BK7 | F/# = 100 |
| R2 = −173.16 mm | T = 27 mm | | EFL = 100 mm | where F/# is the effective focal length divided beam diameter where EFL is the effective focal length.

Design wavelengths 486.1 nm 587.6 nm(primary) 656.3 nm

The corresponding f-Sin(θ) characteristic is shown in FIG. 2.

Figure 3:
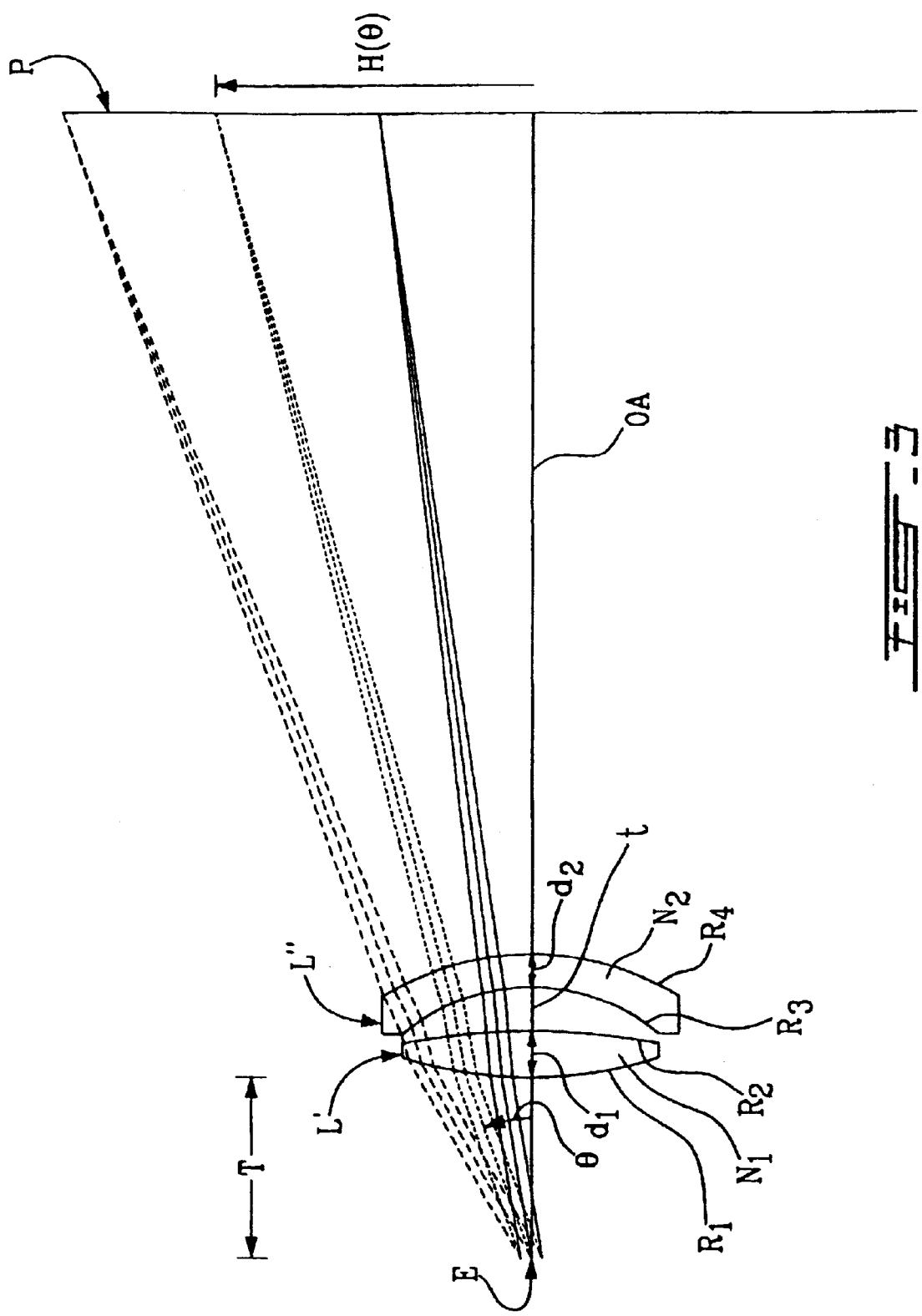
FIG. 3 is the optical layout of the refractive configuration of a f-Sin(θ) doublet also in accordance with the present invention.

FIG. 3 shows the two air space element f-Sin(θ) doublet lens with the following prescription:

| | | | |
|---|---|---|---|
| R1 = 50.05 mm | d1 = 5 mm | N1 = 1.5168 | F/# = 40 |
| R2 = −65.24 mm | t = 5 mm | | T = 19.6 mm |
| R3 = −21.10 mm | d2 = 3.55 mm | N2 = 1.7847 | EFL = 100 mm |
| R4 = −28.86 mm | | | |

Design wavelengths 486.1 nm 587.6 nm (primary) 656.3 nm

In FIG. 3, the F-Sin($\theta$) doublet comprises a first proximal lens L' having opposed surfaces R1 and R2, and a second distal lens L" having opposed surfaces R3 and R4, respectively separated by distances d1 and d2 and having respective indexes of refraction N1 and N2.

Figure 4:
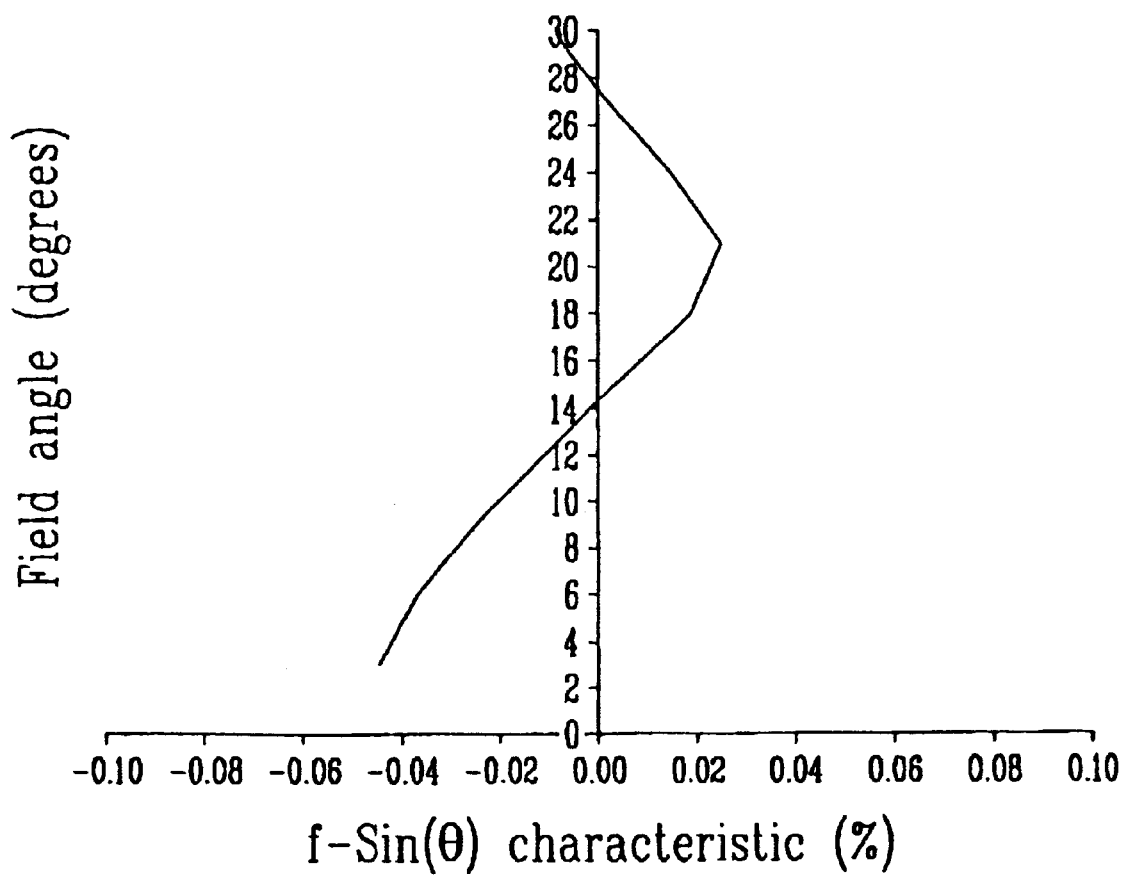
FIG. 4 graphically illustrates the f-Sin(θ) correction in the arrangement of FIG. 3.

The corresponding f-Sin($\theta$) characteristic is shown in FIG. 4. The lenses L' and L" are separated by distance t.

Figure 5:
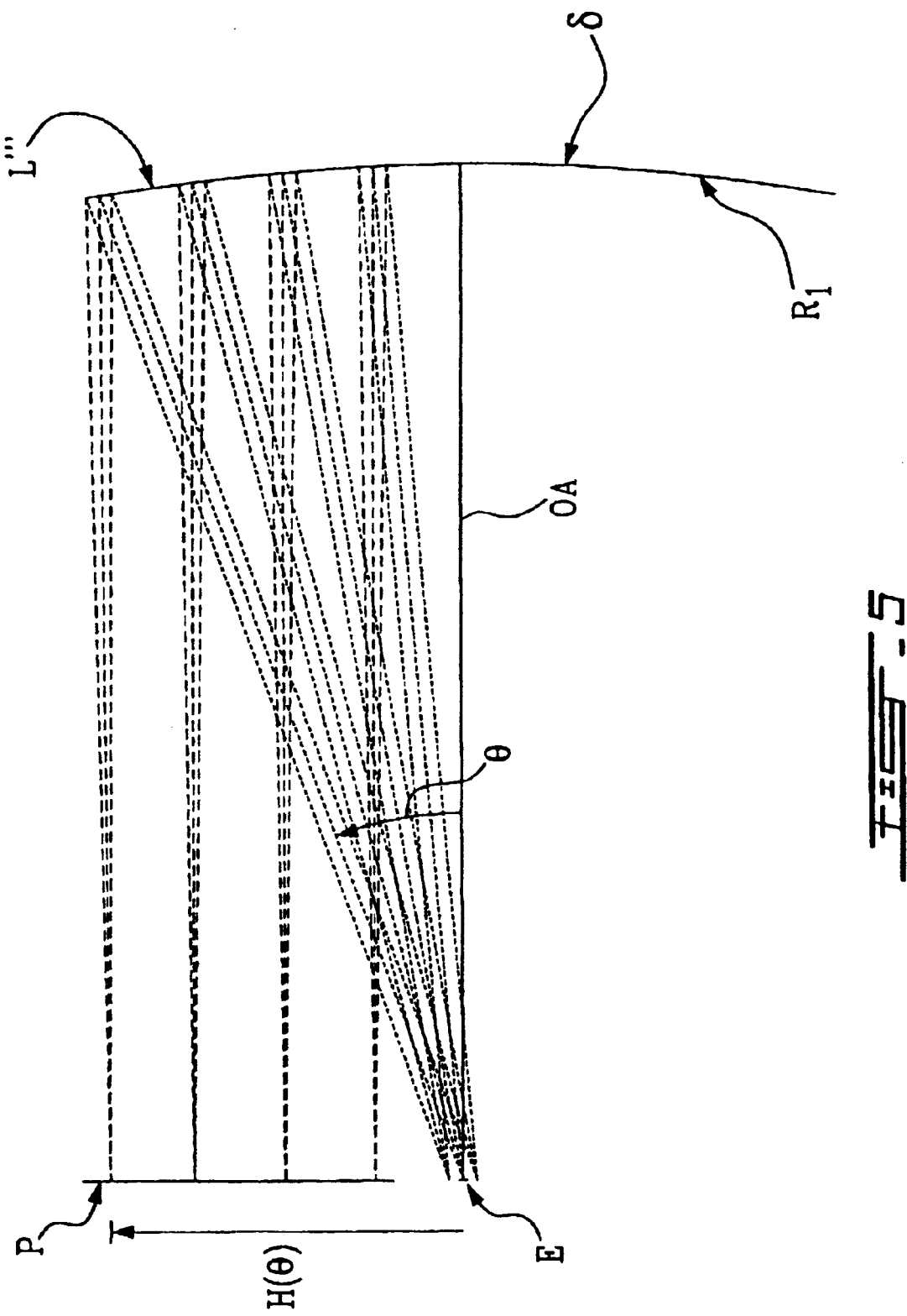
FIG. 5 is the optical layout illustration of a reflective configuration of the f-Sin(θ) lens further in accordance with the present invention.

FIG. 5 shows a reflective configuration of a f-Sin($\theta$) lens L'''. This embodiment can be used when a large bandwidth is required in various applications. The optical prescriptions are:

| | | |
|---|---|---|
| R1 = −200 mm | T = 100 mm | F/# = 40 |
| $\delta$ = 0.908 mm | | EFL = 100 mm |

Design wavelengths 486.1 nm 587.6 nm (primary) 656.3 nm

In FIG. 5, the lens L''' comprises a reflective surface R1 with a conical constant 8.

Figure 6:
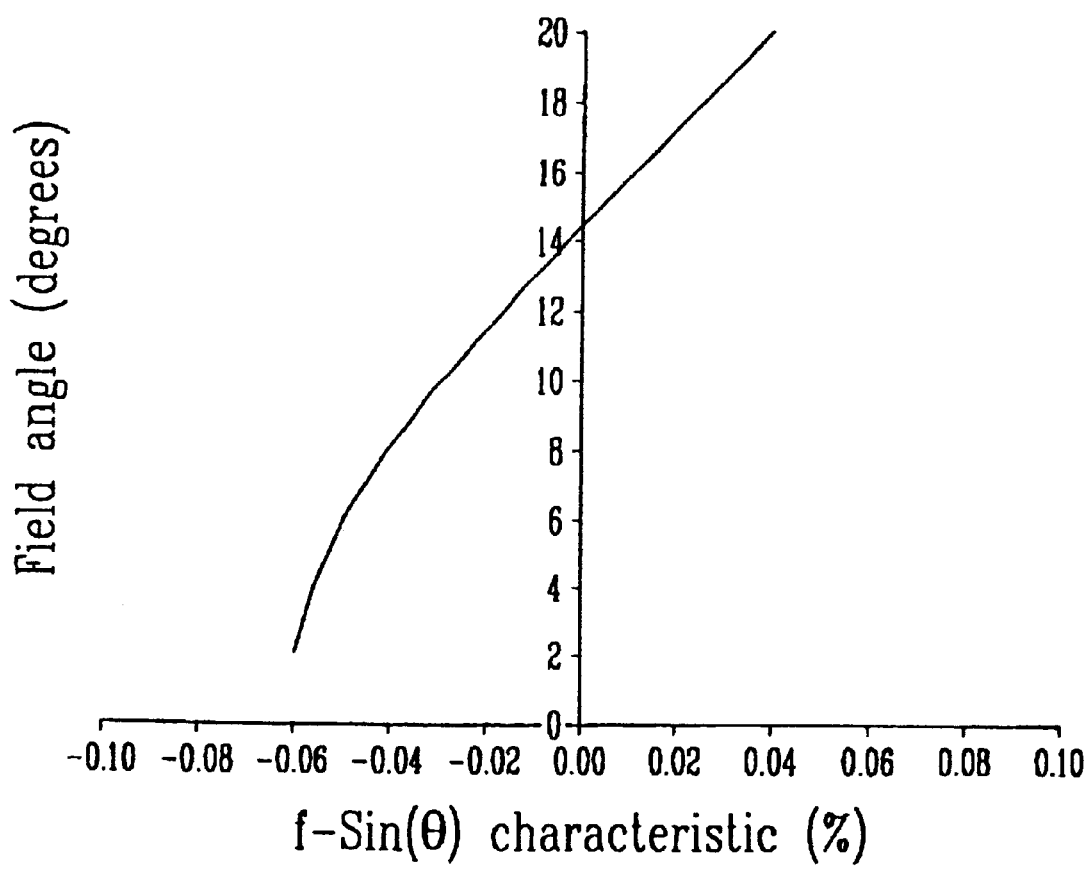
FIG. 6 graphically illustrates the f-Sin(θ) correction in the arrangement of FIG. 5.

The corresponding f-Sin($\theta$) characteristic is shown in FIG. 6.

Figure 7:
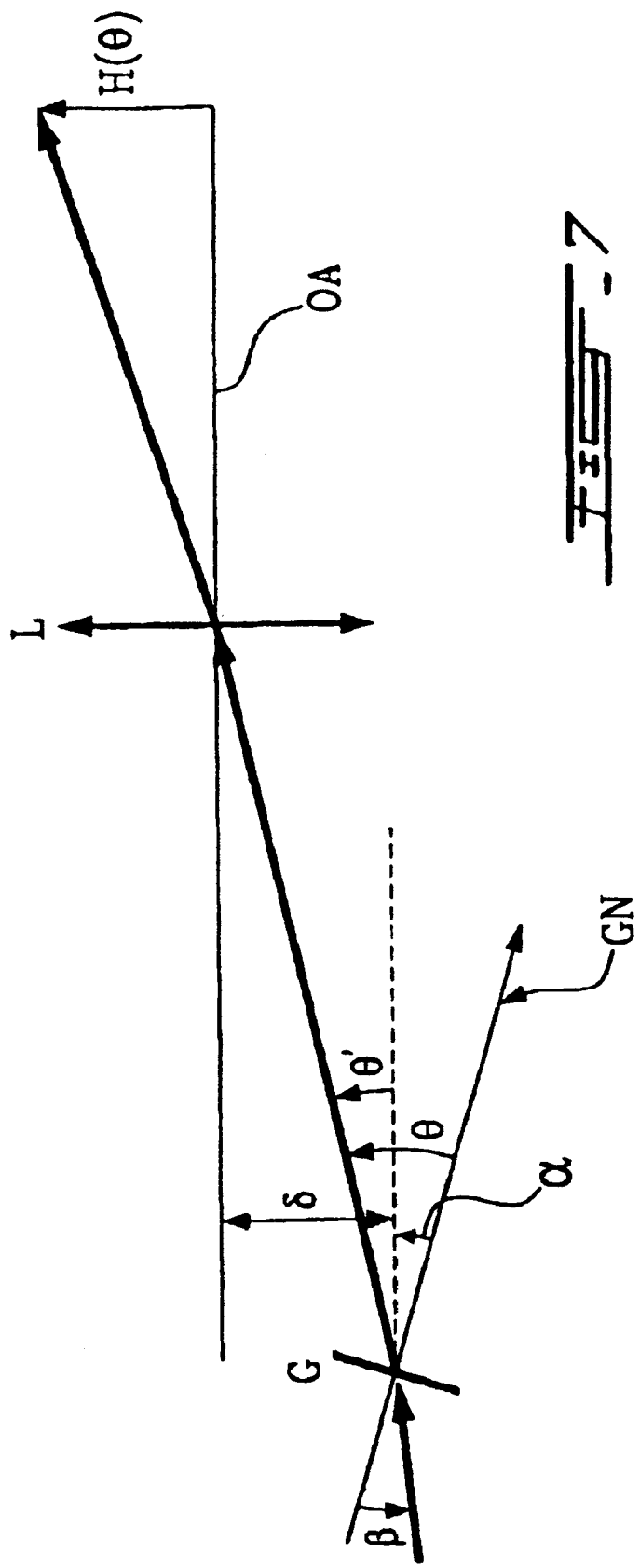
FIG. 7 is a schematic view of the diffraction grating and the lens with the diffraction angle and the incident angle are different.

The invention is also valid when the normal of the grating (GN) make an angle $\alpha$ with the optical axis of the f-Sin($\theta$) lens or lens group as we can see in FIG. 7. However in this particular case, the diffraction angle $\theta$ is not equal to the incident angle on the f-Sin($\theta$) lens. The definition of H($\theta$) is the same as presented above but for the incident angle on the lens, we can express the relation as:

$$H(\theta)=H(\theta')=f\cdot\text{Sin}(\theta'+\alpha)$$

where $\theta'$ is the incident angle on the lens respecting the optical axis (OA). The angles are positive as shown in the FIG. 7.

A distance $\delta$ between the optical axis of the lens and the center of the diffraction grating is also possible. In such a case, the invention is also valid.

What is claimed is:

1. An optical system for obtaining a linear output from an incident light, comprising a diffraction grating and a group of lenses having a f-Sin($\theta$) characteristic, where f is the effective focal length of said group of lenses and $\theta$ is an output angle of the light exiting from said diffraction grating, wherein a light incident on said diffraction grating reaches said group of lenses and results in a linear output.

2. An optical system as defined in claim 1, wherein said group of lenses has at least one of diffractive, refractive and reflective properties.

3. An optical system as defined in claim 1, wherein said incident light is one of a collimated beam, a converging beam and a diverging beam.

4. An optical system as defined in claim 1, wherein said diffraction grating is one of a plane grating, a concave grating and a convex grating.

5. An optical system for obtaining a linear output from an incident light, comprising a diffraction grating and a lens having a f-Sin($\theta$) characteristic, where f is the effective focal length of said lens and $\theta$ is an output angle of the light exiting from said diffraction grating, wherein a light incident on said diffraction grating reaches said lens and results in a linear output, wherein said diffraction grating is placed on an entrance pupil of said lens, whereby said incident light transmitted through said diffraction grating passes through said lens and is focused on an image plane.

6. An optical system as defined in claim 5, wherein said lens has at least one of diffractive, refractive and reflective properties.

7. An optical system as defined in claim 5, wherein said incident light is one of a collimated beam, a converging beam and a diverging beam.

8. An optical system as defined in claim 5, wherein said diffraction grating is one of a plane grating, a concave grating and a convex grating.

9. An optical system as defined in claim 1, wherein said diffraction grating is placed on an entrance pupil of said group of lenses, whereby said incident light transmitted through said diffraction grating passes through said group of lenses and is focused on an image plane.

\* \* \* \* \*